United States Patent [19]
Schjeldahl

[11] 4,082,203
[45] Apr. 4, 1978

[54] APPARATUS FOR HANDLING SUPERIMPOSED STACKED RECEPTACLES

[76] Inventor: Gilmore T. Schjeldahl, 4436 Marlborough Ct., Minnetonka, Minn. 55343

[21] Appl. No.: 768,776

[22] Filed: Feb. 15, 1977

Related U.S. Application Data

[63] Continuation-in-part of Ser. No. 664,298, Mar. 5, 1976, abandoned.

[51] Int. Cl.² .............................................. B65G 59/06
[52] U.S. Cl. ..................... 221/211; 221/251
[58] Field of Search ............... 221/211, 223, 299, 300, 221/251, 88, 238, 214, 215, 221; 214/8.5 C, 8.5 D, 8.5 K

[56] References Cited

U.S. PATENT DOCUMENTS 3,795,346  3/1974  Roberts et al. ...................... 221/223

*Primary Examiner*—Stanley H. Tollberg
*Attorney, Agent, or Firm*—Orrin M. Haugen

[57] ABSTRACT

Apparatus for separating and delivering individual frustoconical containers from a stacked column of nested frustoconical containers, each container having an upper rim and an outwardly projecting stacking shoulder spaced from the rim, along with a carrying bail secured generally diametrically of the container body. A yoke element is provided for engaging the carrying bail of the penultimate container in the stack, so as to permit vertical separation of the lowermost container of the column from the remainder of the stack.

7 Claims, 14 Drawing Figures

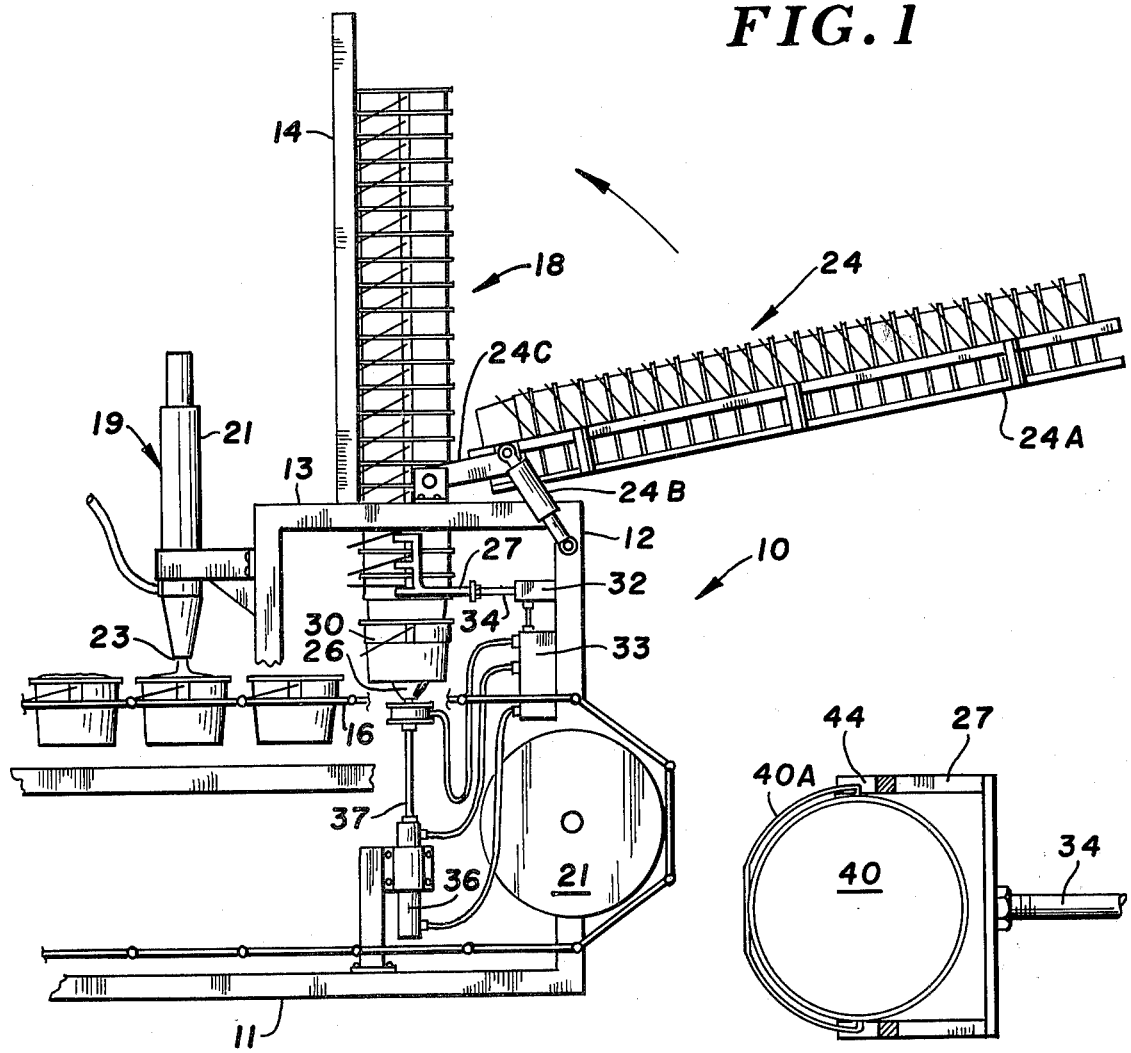
FIG. 1
FIG. 3
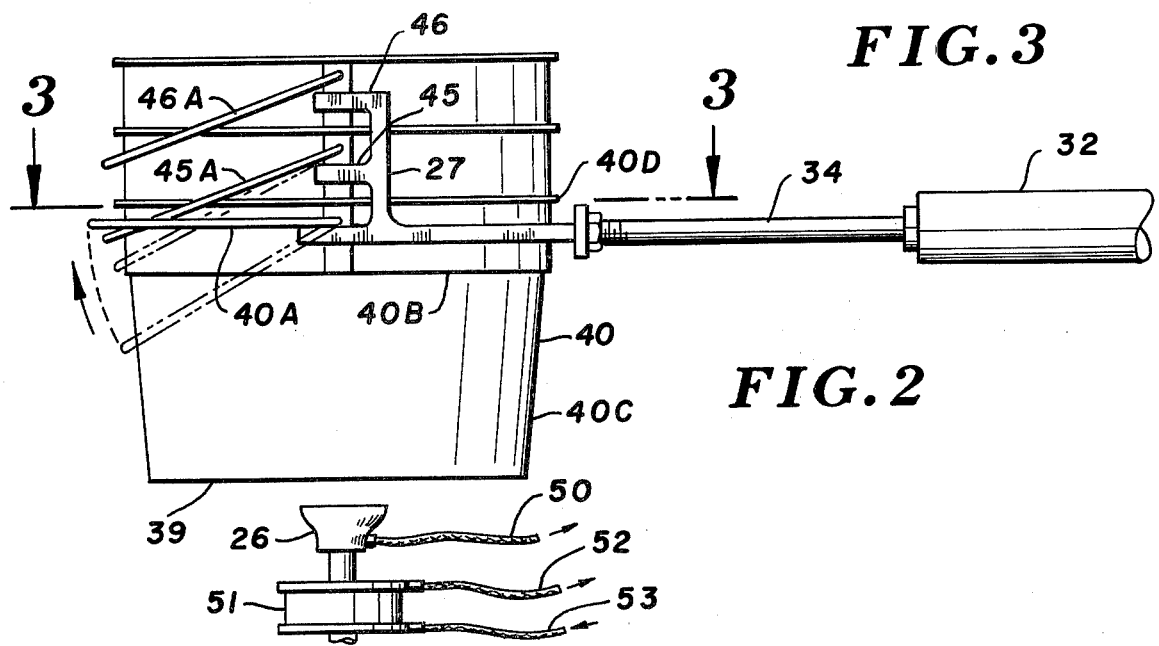
FIG. 2

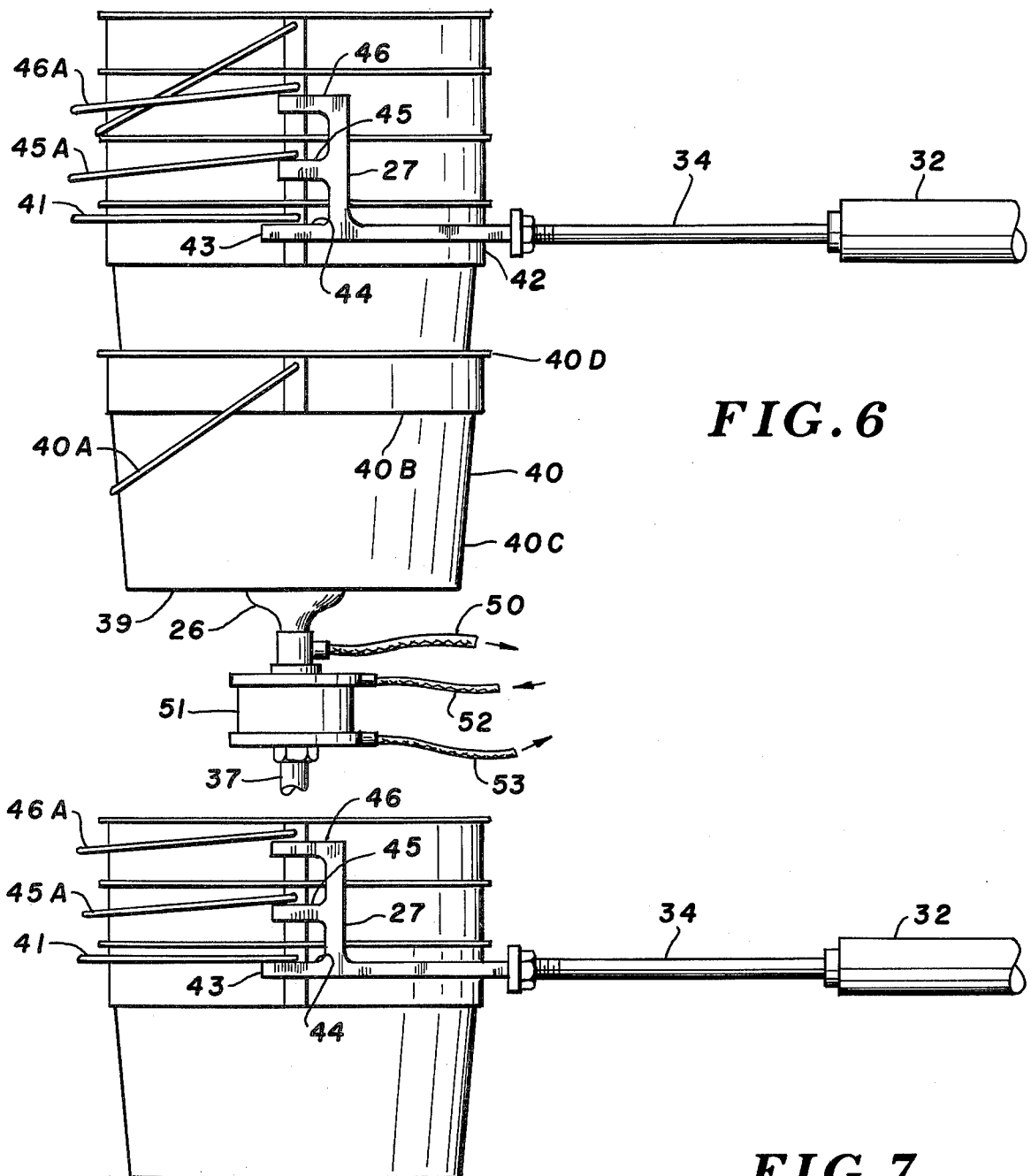
FIG. 6
FIG. 7
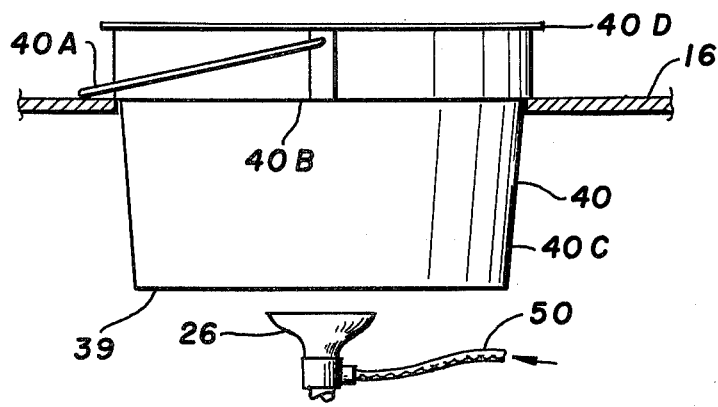

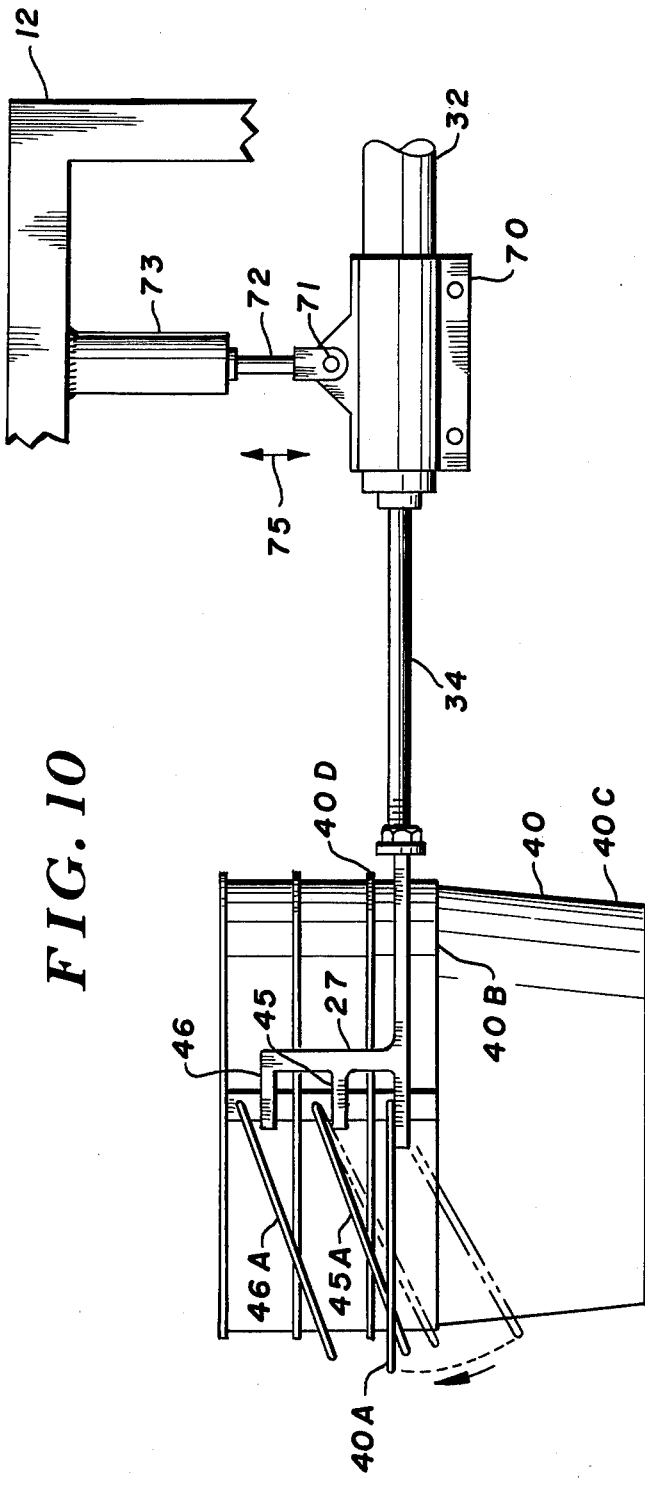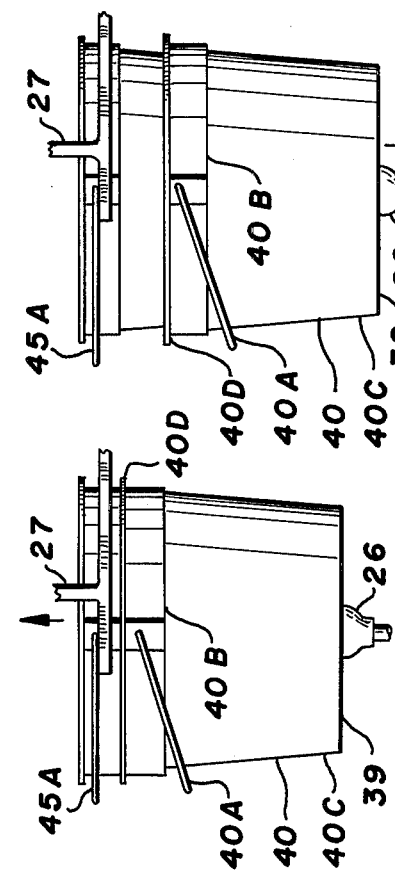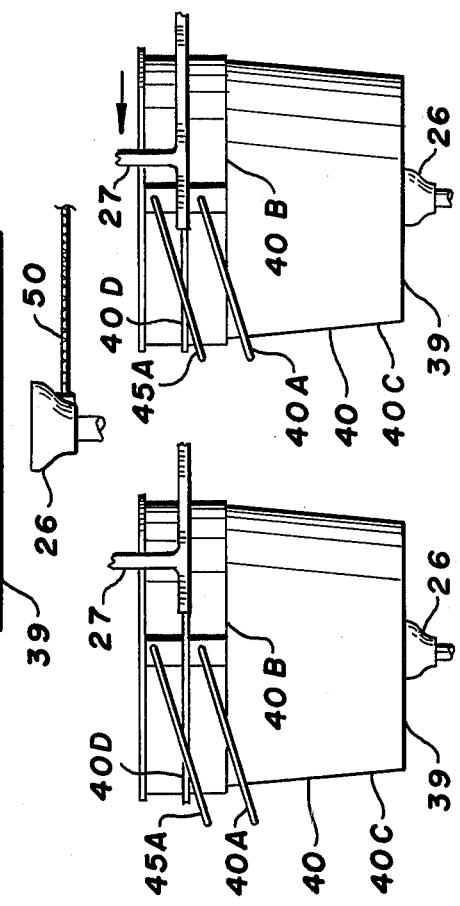

APPARATUS FOR HANDLING SUPERIMPOSED STACKED RECEPTACLES

CROSS-REFERENCE TO RELATED APPLICATION

The present application is a continuation-in-part of my copending application Ser. No. 664,298, filed Mar. 5, 1976 and entitled "METHOD AND APPARATUS FOR HANDLING SUPERIMPOSED STACKED RECEPTACLES" now abandoned.

BACKGROUND OF THE INVENTION

The present invention relates generally to an improved method and apparatus for the handling of superimposed stacked receptacles, and more specifically to such a method and apparatus for handling of nested superimposed columns of stacked receptacles or containers wherein means are provided for controlling and positioning the carrying bails of the containers at the lower end of the stack so as to permit vertical separation and removal of the lowermost container of the vertical column or stack.

In the packaging of certain commodities, such as, for example, ice cream or the like, carrying containers or receptacles are provided for the convenient packaging of the product, as well as for convenient carrying or handling of the product by the consumer. Containers of this type are normally fabricated from polyethylene, composition board, or the like. These empty containers are normally shaped so as to have a frustoconical configuration to permit nesting of the empty containers, with the consequent conservation of storage volume for the empty containers.

Traditionally, these frustoconical containers have a base, an upper rim, and an outwardly projecting stacking shoulder which is formed along the periphery of the container body and at a location spaced from the upper rim. A generally semi-circular carrying bail is secured to the walls of the container at generally diametrically opposed points between the stacking shoulder and the upper rim. When free-hanging, the carrying bail will normally rest against the outer periphery of the body at a downwardly extending or declining angle. When in stacked or nested disposition, these carrying bails frequently interfere with the vertical separation of the bottom or lowermost container of the stack, the carrying bail of the penultimate container frequently becoming entangled with the upper rim of the lowermost container in the stack. The apparatus of the present invention provides means for controllably positioning the carrying bail of the penultimate container in a stacked column of containers so as to permit order controlled and orderly vertical separation of the lowermost container of the stack.

SUMMARY OF THE INVENTION

Briefly, the apparatus of the present invention includes means for retaining a stacked column of superimposed or nested frustoconical containers, with means for controllably delivering individual containers from the stack to a receiving surface. Once on the receiving surface, the container is moved to a loading zone where it is filled with product. The filling means includes apparatus designed for interrupted feeding or dropping of product.

The container handling means includes a generally "U" shaped yoke having a pair of laterally spaced legs which are arranged to straddle or otherwise receive a container therebetween. Means are provided for reciprocatorily moving the yoke along a generally horizontal path between forward and retracted dispositions. When in the forward disposition, the upper surface of at least one of the legs of the yoke engage the carrying bail of the penultimate container of the stack, and pivot the engaged bail upwardly to a generally horizontal and non-interferring disposition, thereby permitting orderly vertical separation of the lowermost container from the vertical stack. Column support means are provided for intermittently supporting the lowermost container of the stack, and the same column support means, or alternately, the support means for the "U" shaped yoke may be utilized for controllably lowering the elevation of the column by controlled incremental amounts. The magnitude of the drop is substantially equal to the normal vertical spacing between adjacent containers in the stack, thereby re-positioning the column vertically to provide for engagement of the legs of the yoke with the carrying bail and the then penultimate container of the stack.

Therefore, it is a primary object of the present invention to provide an improved method and apparatus for the handling of superimposed stacked receptacles, particularly those receptacles having a frustoconical configuration and being provided with a stacking shoulder and a carrying bail adjacent the upper rim portion thereof.

It is a further object of the present invention to provide an improved apparatus for the handling and delivering of individual frustoconical containers from a stacked column of such containers, wherein means are provided for controllably holding and retaining a stacked column of such containers in a form whereby the carrying bail is held out-of-contact with the body of the container, whereby the lowermost container of the stacked column may be controllably removed.

It is yet a further object of the present invention to provide an improved apparatus for the handling of frustoconical containers arranged in stacked disposition, the apparatus providing for means to controllably release the lowermost container from the stacked column during each operational cycle, the release occurring while the column is being supported by the carrying bail of the penultimate container of the stacked column, and with the lowermost container thereby being delivered to a container receiving surface for ultimate transfer of the released container to a product loading station.

Other and further objects of the present invention will become apparent to those skilled in the art upon a study of the following specification, appended claims, and accompanying drawings.

BRIEF DESCRIPTION OF THE DRAWINGS

FIG. 1 is a side elevational view of a typical container handling apparatus, and illustrating a portion of a product filling conveyor in conjunction therewith, with FIG. 1 further illustrating an arrangement for loading additional stacks or columns of containers for introduction into the apparatus during operation;

FIG. 2 is a side elevational view, on a slightly enlarged scale, and illustrating the details of certain of the container handling components, with this view being taken showing the stack being supported by the container handling yoke, with the stack about to become supported by a support cup adjacent the undersurface of the lowermost container in the stack;

FIG. 3 is a horizontal sectional view taken along the line and in the direction of the arrows 3—3 of FIG. 2, and illustrating a top view of the container handling yoke;

FIG. 6 is a view of a further sequence in the operational cycle, wherein the lowermost container has been drawn downwardly and separated from the stack by the stack supporting cup, and wherein the balance of the stack or column is being supported by the yoke;

FIG. 7 is a view of a still further point in the sequence of operation, wherein the lowermost container has been delivered to a container receiving surface such as in the conveyor flight as illustrated;

FIG. 10 is a side elevational view, on a slightly enlarged scale from FIG. 1, and illustrating the details of a modified embodiment of the container handling components of the present invention, and illustrating an arrangement wherein the column support function is achieved by the container handling yoke; and FIGS. 11A, 11B, 11C, and 11D are side elevational views illustrating the operational sequence occurring during a cycle of the modified embodiment illustrated in FIG. 10.

DESCRIPTION OF THE PREFERRED EMBODIMENT

Figure 4:
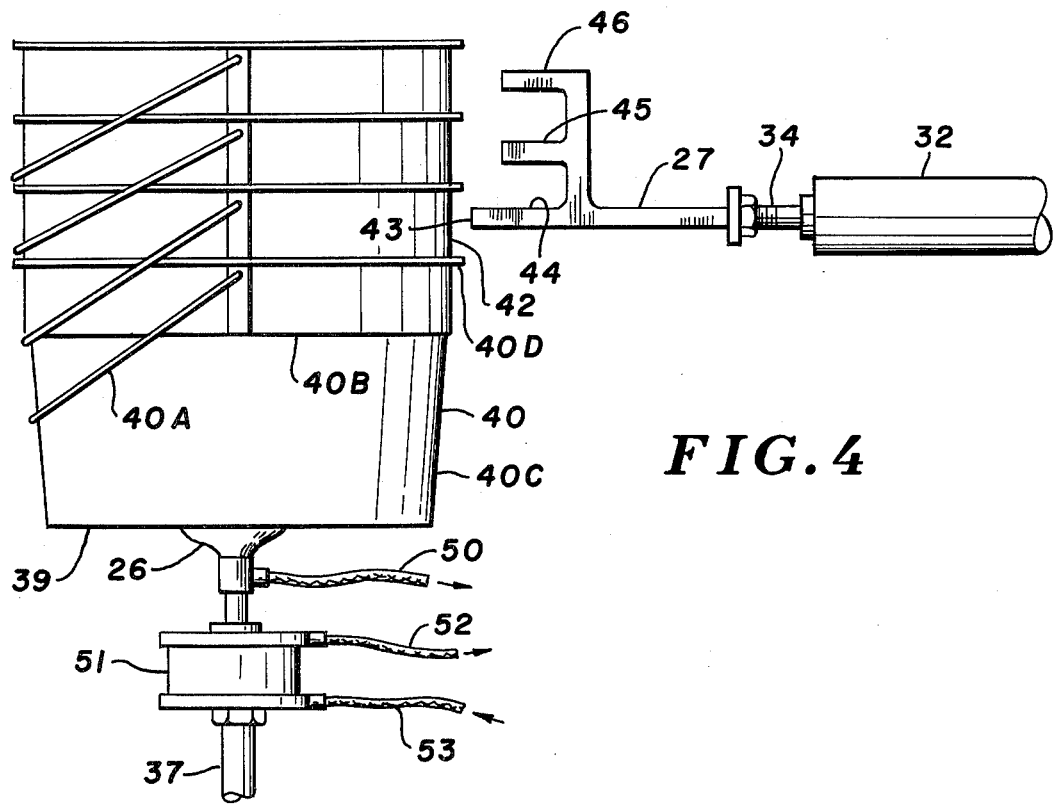
FIG. 4 is a view similar to FIG. 2, and illustrating the disposition of the apparatus at a point in time when the yoke has been retracted so as to permit the stack to drop down onto the support cup.

Attention is initially directed to FIG. 1 of the drawings wherein the container handling apparatus generally designated 10 includes base frame elements 11, upright support posts 12 and container stack or column supporting members 13 and 14. A container conveyor is also illustrated, with conveyor flight 16 being provided for transporting the individual containers from the column or stack shown generally at 18 to the product filling station shown generally at 19. Drive sprocket 20 is utilized for providing motion to propel the conveyor, and specifically flight 16 as desired. In the illustration or embodiment illustrated, product is introduced from station 19 by means of the product injector element 21, having a discharge nozzle as illustrated at 23. As is apparent in the illustration of FIG. 1, stack or column 18 is designed to be replaced by reserve stack 24 upon exhaustion or substantial exhaustion of the individual containers making up stack or column 18.

Container articulating devices are provided in the apparatus, particularly in connection with those portions or components of the apparatus shown in FIG. 1. Generally speaking, the stack is supported alternately by support cup 26 and bail yoke 27, as will be more fully explained hereinafter. Support cup 26 performs additional functions as well, including the function of controlling the downward motion of the stack or column 18, and the ultimate withdrawal or removal of the lowermost container from the stack, all of which will be more fully explained and detailed hereinafter.

In the disposition illustrated in FIG. 1, lowermost container such as container 30 is shown as it is about to enter the cavity or opening formed in flight 16 (see, for example, FIG. 7) of the conveyor mechanism. As is apparent from the view of FIG. 1, support for the remaining containers of stack 18 is obtained from yoke member 27, with yoke 27 further controlling or maintaining the carrier bails in non-interferring relationship with the lowermost container, in this instance, container 30.

The disposition of the stack 18 as illustrated in FIG. 1 is retained until container 30 is disposed within the bore formed in flight 16 (see FIG. 7), the retraction or lowering of support cup 26 continuing so as to permit flight 16 to index one position, thereby advancing the flight so as to permit raising of support cup 26 into contact with the then lowermost container member of stack 18. Cylinder 32 is then actuated by means of a valve in control 33, so as to retract rod 34, thereby permitting the entire stack 18 to rest upon support cup 26. In the next sequence, cylinder 36 is actuated by control 33 so as to effect a slight retraction of rod 37, thereby lowering cup 26 so as to permit re-advancing of rod 34 and consequently yoke 27 to intercept stack 18 at a point whereby the penultimate container in stack 18 will be engaged by yoke 27.

Figure 5:
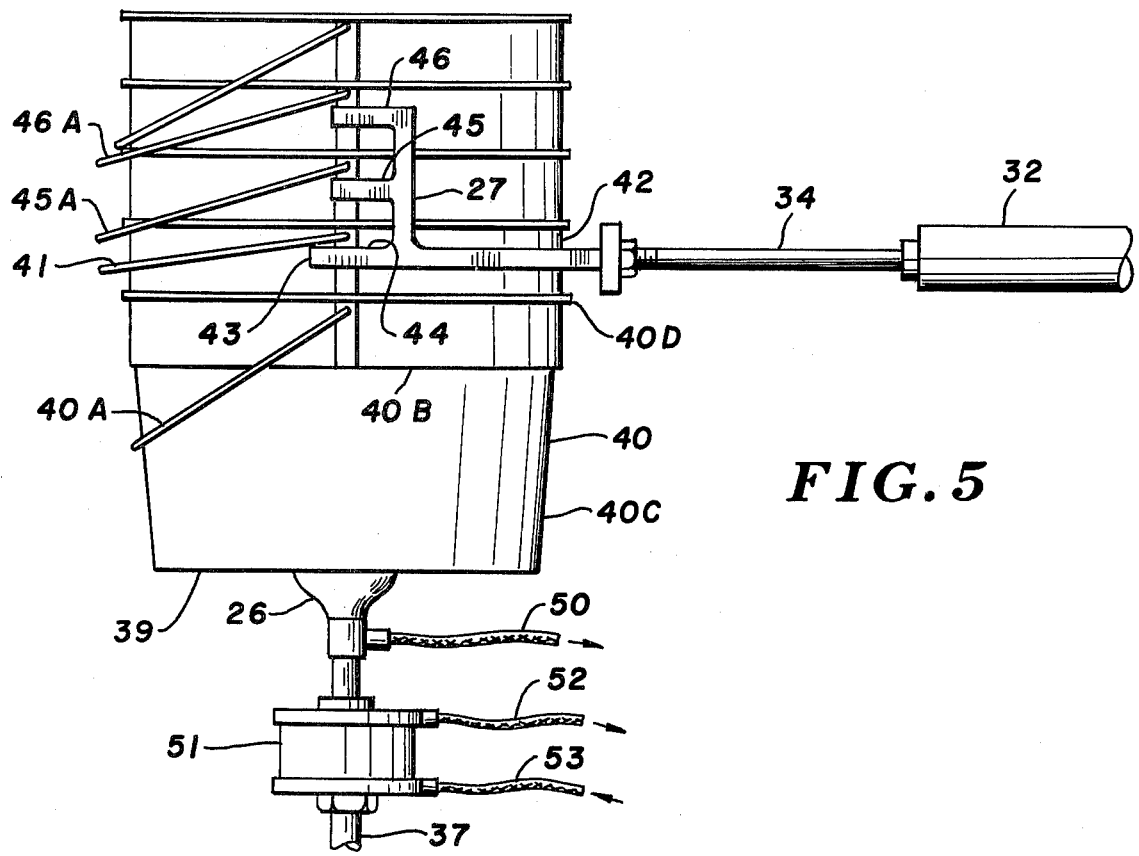
FIG. 5 is a view similar to FIG. 2 and illustrating a still further arrangement in the sequence wherein the yoke is advanced to a forward disposition, thereby forcing or pivotally grazing the carrying bail of the penultimate container in the stack, thus avoiding interference of the bail with the adjacent container.

Attention is now directed to FIG. 3 of the drawings wherein this sequence is being illustrated. Specifically, in FIG. 2, support cup 26 is advancing upwardly to engage lower surface 39 of the lowermost container in the stack, in this instance, container 40. Continued advancing of support cup 26 occurs until the arrangement is reached as is illustrated in FIG. 4, with container 40 resting firmly on the support cup 26. Yoke 27 is shown retracted, thus permitting the entire stack to rest solely on cup 26. This situation exists until the next sequence occurs, which is the advance of rod 34 from cylinder 32, thus causing yoke 27 to engage the penultimate container in the stack 18. As is illustrated in FIG. 5, carrier bail 41 of penultimate container 42 is elevated in a clockwise direction from the at-rest disposition illustrated in the bail 40A of container 40. Also, it will be apparent from FIG. 5 that the forward tine member 43 of yoke 27 has an upper surface as at 44 which in fact engages the undersurface of bail 41 in the disposition illustrated in FIG. 5. If desired, shorter tine elements as at 45 and 46 may be employed to elevate or move carrier bails 45A and 46A respectively, with this movement being undertaken to assure a non-interferring disposition of bail 41 with container 40. As is apparent in the drawings, it is the outer or mid portion of the carrier bails which tends to interfere with the stacking shoulder 40B of the container 40. As is apparent, each of the containers is identical, one to another, and is provided with a frustoconical body as illustrated at 40C, along with an outwardly extending upper rim as at 40D, all of which is illustrated in detail in FIG. 5. The bail members are, of course, generally semi-circular and are coupled to the periphery of the individual containers generally diametrically thereof.

Attention is now directed to FIG. 6 of the drawings wherein the next sequence of motion is illustrated, FIG.

6 illustrating that portion of the sequence wherein the container 40 is being drawn downwardly and separated from the other members of the stack 18 by support cup 26. Support cup 26 is coupled to a vacuum source through tubing 50, as indicated, with the vacuum source evacuating the concave interior of cup 26 so as to attach firmly to the surface of the base of container 40. Limited vertical motion of cup 26 is obtainable by means of double-acting cylinder 51, with cylinder 51 being coupled to a pressure source through line 52, and to a pressure reduction or vacuum source through line 53. Upon reaching the disposition illustrated in FIG. 4, motion continues as is illustrated in FIG. 7.

In the illustration of FIG. 7, container 40 is held within flight 16 as is illustrated. Continued downward motion of cup 26 is achieved by virtue of the long stroke cylinder 36, as is shown in FIG. 1. This arrangement permits retraction of cup 26 to a point beneath the surface of flight 16, thereby rendering it possible for indexing or advancing of flight 16 to accommodate the next sequence of motion. Also, cup 26 is, as illustrated in FIG. 7, released from the lower surface of container 40 as is, of course, desirable.

Figure 9:
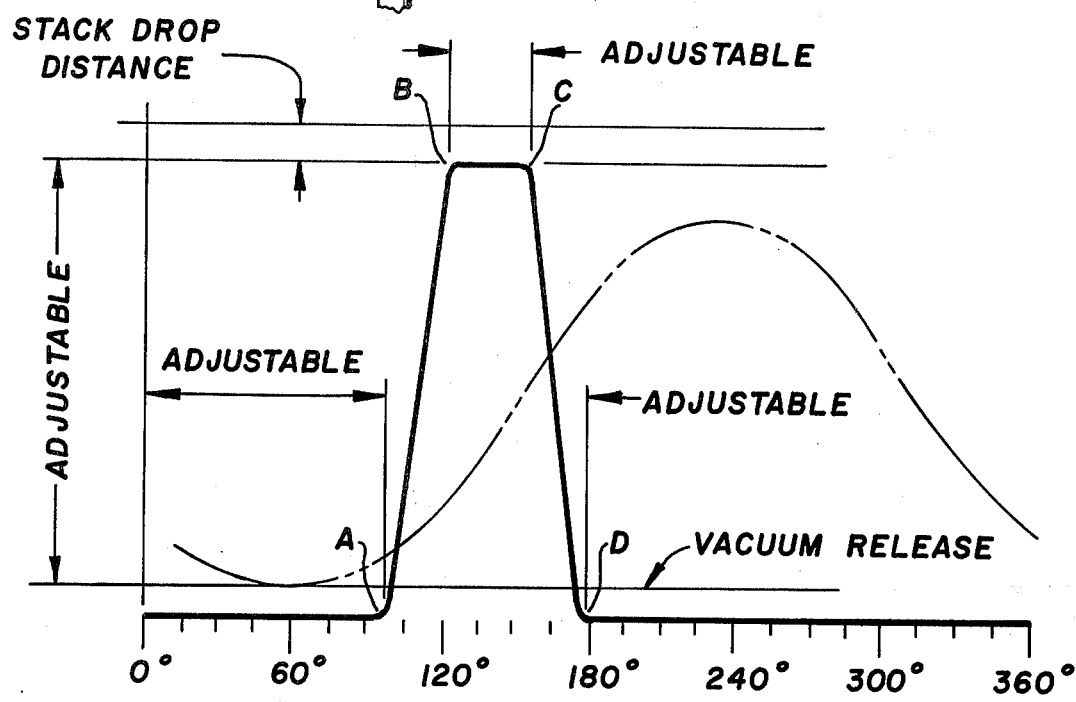
FIG. 9 is a plot of the sequential operation of the apparatus, with the plot illustrating one complete cycle of machine motion.

Turning now to the plot illustrated in FIG. 9, the phantom sinusoidal curve illustrates the motion of a conventional container feeder cam in a typical cyclical operation. In the solid line as illustrated, the point A is reached and represents the starting time for the sequence of operation, and illustrates the rise of cup 26 from the retracted disposition illustrated in FIG. 7 toward the extended disposition illustrated in FIG. 4. Point B on the plot indicates the arrival at the disposition illustrated in FIG. 4, with the time lapse from point B to point C representing the time during which cup 26 is being evacuated so as to become firmly attached to the base of the lowermost container in stack 18. At point C, cup 26 commences retraction as is apparent in the illustration of FIGS. 5 and 6, with retraction being commenced only after completion of advance of rod 34 so as to permit yoke 27 to engage the bail of the penultimate container in the stack. Downward retraction which commences at point C then continues until point D is reached, with this being represented by the disposition illustrated in FIG. 7. In order to accommodate various arrangements, it will be appreciated that the stack drop distance which is illustrated in FIG. 9 may be varied, as can the vertical distance between the top of travel of cup 26 to the lower level of travel of cup 26 which is represented at the abscissa of FIG. 9. The timing is also variable in order to accommodate various designs and container structures.

Figure 8:
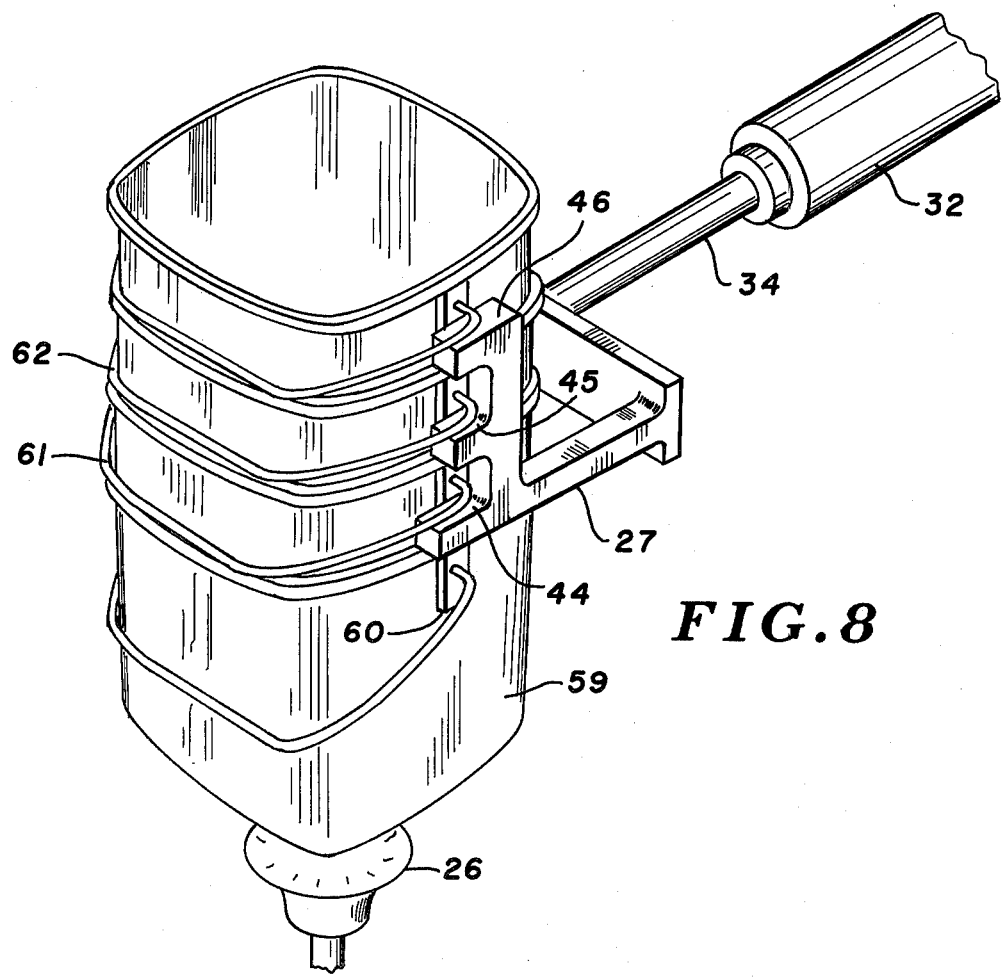
FIG. 8 is a perspective view illustrating an arrangement of stacked containers having a somewhat modified form or configuration from the containers illustrated in FIGS. 1–7 inclusive.

With attention now being directed to FIG. 8, it will be noted that the apparatus is adaptable for use in connection with modified container designs, such as a container having the configuration of container 59, which is frustoconical in shape and is provided with stacking shoulders 60. Yoke 27 is capable of articulation so as to engage bails such as bails 61 and 62 so as to pivot them into a non-interferring disposition.

It will be appreciated that the structure of the present invention is adapted for use with a variety of products to be packaged, and is also adapted for use in conjunction with a variety of filler devices. In order to render the operation more fully continuous, reserve stack 24 is set into place on stacking bed 24A, with cylinder 24B being utilized to elevate stack 24 about pivot arm 24C until stack 24 may be dropped directly onto the top of a substantially exhausted stack.

The precise configuration of support posts 14 is, of course, not critical to the overall operation, it being noticed, of course, that posts 14 should be arranged so as to avoid interference with motion of the carrier bails, while continuing to provide vertical support and resistance to vertical shift of the stack 18 while yoke 27 becomes engaged with the carrier bails of the individual containers forming the stack.

DESCRIPTION OF AN ALTERNATE EMBODIMENT

Attention is now directed to FIGS. 10 and 11A, 11B, 11C and 11D of the drawings wherein an alternate embodiment is illustrated, and wherein the column support is achieved by controlled vertical motion of cylinder 32. It will be appreciated that those numerical designations common between FIGS. 2 and 10 will refer, of course, to identical components, and that certain additional components are present in order to achieve the function of the alternate embodiment.

In this connection, cylinder 32 is securely mounted or retained within suspending cradle 70, with cradle 70 being, in turn, secured at mounting point 71 to the ram 72 of rigidly mounted double-acting cylinder 73. The vertical motion of the ram 72, as designated by double arrow 75, illustrates the manner in which the cylinder 32 may be dropped controllably so as to lower the column 18 pursuant to the cycle schedule illustrated in FIGS. 11A–11D inclusive.

Specifically, the "U" shaped yoke 27 is shown in its retracted position in FIG. 11A, and is advanced to its position shown in FIG. 11B so as to engage the bails, in the same fashion as has been previously explained in FIGS. 1–9 inclusive. In order to permit removal of the lowermost container, "U" shaped yoke 27 is raised vertically, so as to permit removal of the lowermost container from the column. Upon removal of the lowermost container from the column, cylinder 73 is permitted to advance ram 72 so as to lower yoke 27, and thereby drop the column 18 to a lower vertical disposition. Support cup 26 may, of course, be utilized as required for the individual operation. In certain loading arrangements and configurations, support cup 26 may be utilized to support the column and adjustably control the disposition of the column. For example, as is illustrated in FIGS. 11A through 11D inclusive, the vertical disposition of support cup 26 may be used to both control the vertical disposition of the column and achieve release or removal of the lowermost container. In certain instances, of course, the support cup 26 could be in the form of a vacuum cup, as previously indicated, or a separate support plate or member.

As has been indicated, cylinder 73 is a double-acting cylinder and may be provided with fluid to control the vertical motion of the ram 72. In certain instances, it may be desirable to advisable to permit the lowering of ram 72 to occur by gravity, thereby requiring only a valve or choke in the line so as to permit gravity advance of ram 72. Obviously, ram 72 could be advanced by the application of pressurized fluid to cylinder 73 as is conventional.

In order to maintain horizontal alignment, it may be necessary in certain instances to provide a follower, guide channel or the like for the rear portion of cylinder 32. In certain other instances, however, the ram may be coupled to the yoke or cradle 70 in such a way that vertical and horizontal alignment are both maintained.

It has been indicated that the support cup 26 is utilized to achieve separation of adjacent containers in the stack, and particularly to achieve separation of the lowermost container. As an alternate, it will be appreciated that means may be provided to grip other segments or surfaces of the container, including the upper lip, the bail, or like surfaces or abutments.

I claim:

1. Container delivery means for sequentially delivering individual containers from a nested stack, with said containers each having a frustoconical body with a base, an upper rim and an outwardly projecting stacking shoulder formed along said body and spaced from said rim, and a generally semi-circular carrying bail secured to the periphery of said container generally diametrically thereof and along said body between said stacking shoulder and said upper rim and normally engaging the exterior of said frustoconical container at an elevation between said stacking shoulder and the base thereof; said container delivery means comprising:

(a) stacking means for retaining a generally vertical column of said containers in nested relationship, means for intermittent delivery of individual containers onto a receiving surface and including a column supporting delivery control apparatus, said column supporting delivery control apparatus comprising:

(1) a container straddling yoke element having a generally "U" shaped head with a pair of laterally spaced legs arranged to receive a container therebetween and having means for reciprocatorily moving said head along a generally horizontal path between forward and retracted dispositions;

(2) the container engaging surface of said "U" shaped head being normally disposed along a plane spaced from said container receiving surface by a distance greater than the height of said container and having at least one of said legs arranged to engage said carrying bail and pivot said bail upwardly to a generally horizontal disposition for permitting vertical separation of the lowermost container of said generally vertical column; and (3) column support means engaging said column and including vertical drive means for supporting and controllably lowering the elevation of said column by an incremental amount substantially equal to the normal vertical spacing between adjacent containers in said column so as to drop said column downwardly upon retraction of said "U" shaped yoke from said forward disposition to said retracted disposition and re-position said column vertically to provide for engagement of said legs with the carrying bail on the penultimate container in said column.

2. The container delivery means as defined in claim 1 being particularly characterized in that a plurality of superimposed "U" shaped members are provided for engaging the bails of each of those containers disposed in the stack adjacent the lowermost container of said column.

3. The container delivery means as defined in claim 1 being particularly characterized in that means are provided for grippingly engaging the undersurface of the base of said lowermost container and removing said container downwardly and away from the base of said column and onto said receiving surface.

4. The container delivery means as defined in claim 1 being particularly characterized in that said container receiving surface is an intermittently indexed conveyor.

5. The container delivery means as defined in claim 1 being particularly characterized in that said means for grippingly engaging the undersurface of the base of the lowermost container of said stack is a vacuum cup.

6. The container delivery means as defined in claim 1 being particularly characterized in that said column support means engage the undersurface of the lowermost container of said column and include vertical drive means for supporting and controllably lowering the elevation of said column.

7. Container delivery means for sequentially delivering individual containers from a nested stack, with said containers each having a frustoconical body with a base, an upper rim and an outwardly projecting stacking shoulder formed along said body and spaced from said rim, and a generally semi-circular carrying bail secured to the periphery of said container generally diametrically thereof and along said body between said stacking shoulder and said upper rim and normally engaging the exterior of said frustoconical container at an elevation between said stacking shoulder and the base thereof; said container delivery means comprising:

(a) stacking means for retaining a generally vertical column of said containers in nested relationship, means for intermittent delivery of individual containers onto a receiving surface and including a column supporting delivery control apparatus, said column supporting delivery control apparatus comprising:

(1) a container straddling yoke element having a generally "U" shaped head with a pair of laterally spaced legs arranged to receive a container therebetween and having means for reciprocatorily moving said head along a generally horizontal path between forward and retracted dispositions;

(2) the container engaging surface of said "U" shaped head being normally disposed along a plane spaced from said container receiving surface by a distance greater than the height of said container and having at least one of said legs arranged to engage said carrying bail and pivot said bail upwardly to a generally horizontal disposition for permitting vertical separation of the lowermost container of said generally vertical column;

(3) column support means engaging said column and including vertical drive means for supporting and controllably lowering the elevation of said column so as to permit movement of said column downwardly during retraction of said "U" shaped yoke from said forward disposition to said retracted disposition, and re-position said column vertically to provide for engagement of said legs with the carrying bail on the penultimate container in said column.

* * * * *